(12) United States Patent
Ono et al.

(10) Patent No.: US 8,686,647 B2
(45) Date of Patent: Apr. 1, 2014

(54) LIGHTING CONTROL SYSTEM AND LIGHTING CONTROL METHOD

(71) Applicant: Toshiba Lighting & Technology Corporation, Kanagawa (JP)

(72) Inventors: Takayuki Ono, Kanagawa (JP); Tomoko Ishiwata, Kanagawa (JP); Yoko Noguchi, Kanagawa (JP); Makoto Kawagoe, Kanagawa (JP); Kenji Takahashi, Kanagawa (JP); Hidenori Nishigaki, Kanagawa (JP); Junko Takahashi, Kanagawa (JP); Shigehisa Kawatsuru, Kanagawa (JP); Hitoshi Kawano, Kanagawa (JP); Fumie Iwata, Kanagawa (JP); Katsusuke Uchino, Kanagawa (JP)

(73) Assignee: Toshiba Lighting & Technology Corporation, Kanagawa (JP)

( * ) Notice: Subject to any disclaimer, the term of this patent is extended or adjusted under 35 U.S.C. 154(b) by 0 days.

(21) Appl. No.: 13/660,716

(22) Filed: Oct. 25, 2012

(65) Prior Publication Data
US 2014/0042915 A1    Feb. 13, 2014

(30) Foreign Application Priority Data
Aug. 9, 2012 (JP) ................................. 2012-177204

(51) Int. Cl.
*H05B 37/02* (2006.01)

(52) U.S. Cl.
USPC ............................ 315/153; 315/307; 315/155

(58) Field of Classification Search
USPC .................. 315/149–153, 155, 158, 291, 307
See application file for complete search history.

(56) References Cited

U.S. PATENT DOCUMENTS

| | | | |
|---|---|---|---|
| 8,517,566 B2* | 8/2013 | Gordin | 362/249.02 |
| 2008/0215391 A1* | 9/2008 | Dowling et al. | 705/7 |
| 2010/0295473 A1* | 11/2010 | Chemel et al. | 315/294 |
| 2012/0112667 A1* | 5/2012 | Mohan et al. | 315/307 |
| 2013/0020949 A1* | 1/2013 | Mohan et al. | 315/158 |
| 2013/0088168 A1* | 4/2013 | Mohan et al. | 315/297 |
| 2013/0257289 A1* | 10/2013 | VanWagoner et al. | 315/152 |

FOREIGN PATENT DOCUMENTS

JP    2011-165577    8/2011

\* cited by examiner

*Primary Examiner* — Don Le
(74) *Attorney, Agent, or Firm* — Patterson & Sheridan, LLP.

(57) ABSTRACT

Plural luminaires are installed in a lighting space surrounded by a wall part. A sensor equipment detects existence or non-existence of a person in the lighting space. If existence of a person in the lighting space is detected, the sensor equipment detects a direction of the person. The sensor equipment detects a distance between the wall part positioned in front of the direction of the person and the person. A lighting control unit selectively switches between a first control for performing lighting control of the luminaires to illuminate the wall part positioned in front of the direction of the person if the detected distance is a specified distance or less, and a second control for performing lighting control of the luminaires to reduce brightness at a place as the place becomes farther from a position of the person if the detected distance is larger than the specified distance.

18 Claims, 6 Drawing Sheets

| | FIRST CONTROL | SECOND CONTROL |
|---|---|---|
| DISTANCE[m] | BRIGHTNESS FEELING INDEX [lx] ||
| 3.6 | 97 | 75 |
| 5.4 | 61 | 43 |
| 7.2 | 45 | 38 |
| 9.0 | 37 | 37 |
| 10.8 | 32 | 38 |
| 12.6 | 29 | 34 |

LIGHTING CONTROL SYSTEM AND LIGHTING CONTROL METHOD

INCORPORATION BY REFERENCE

The present invention claims priority under 35 U.S.C. §119 to Japanese Patent Application No. 2012-177204 filed on Aug. 9, 2012. The content of the application is incorporated herein by reference in their entirety.

FIELD

Embodiments described herein relate generally to a lighting control system including plural luminaires installed in a lighting space and a lighting control method.

BACKGROUND

Hitherto, for example, in a facility such as an office or a store, a lighting control system to control plural luminaires installed in a lighting space of the facility is used. In this lighting control system, each of the luminaires has a communication function, and their lighting states can be individually controlled. Thus, in this lighting control system, an area controller as a parent machine of the system, an illuminance sensor, a human detecting sensor and the like are used, and a lighting area and a dimming area can be set in a free layout.

For example, hitherto, control is performed so that brightness feeling is not reduced to a certain degree or less, for example, a luminaire corresponding to an area where existence of a person is detected by a human detecting sensor is turned on, and a luminaire at a position far from the area is turned off.

BRIEF DESCRIPTION OF THE DRAWINGS

FIGS. 1(a) and 1(b) are plan views schematically showing a lighting control system of a first embodiment when viewed from a ceiling side, in which FIG. 1(a) shows a first control of a lighting control method, and FIG. 1(b) shows a second control of the lighting control method.

FIGS. 8(a) and 8(b) are plan views schematically showing a lighting control system of a fifth embodiment when viewed from a ceiling side, in which FIG. 8(a) shows a first control of a lighting control method, and FIG. 8(b) shows a second control of the lighting control method.

FIGS. 10(a) and 10(b) are plan views schematically showing a lighting control system of a sixth embodiment when viewed from a ceiling side, in which FIG. 10(a) shows a first control of a lighting control method, and FIG. 10(b) shows a second control of the lighting control method.

DETAILED DESCRIPTION

In general, according to one embodiment, a lighting control system includes luminaires, an existence or nonexistence detecting unit, a direction detecting unit, a distance detecting unit and a control unit. The plural luminaires are installed in a lighting space surrounded by a wall part. The existence or nonexistence detecting unit detects existence or nonexistence of a person in the lighting space. The direction detecting unit detects a direction of the person if the existence or nonexistence detecting unit detects the existence of the person in the lighting space. The distance detecting unit detects a distance between the wall part positioned in front of the direction of the person detected by the direction detecting unit and the person. The control unit selectively switches between a first control for performing lighting control of the luminaires to illuminate the wall part positioned in front of the direction of the person if the distance detected by the distance detecting unit is a specified distance or less, and a second control for performing lighting control of the luminaires to reduce brightness at a place as the place becomes farther from a position of the person if the distance detected by the distance detecting unit is larger than the specified distance.

Hereinafter, a first embodiment will be described with reference to FIG. 1 to FIG. 4.

Figure 1:
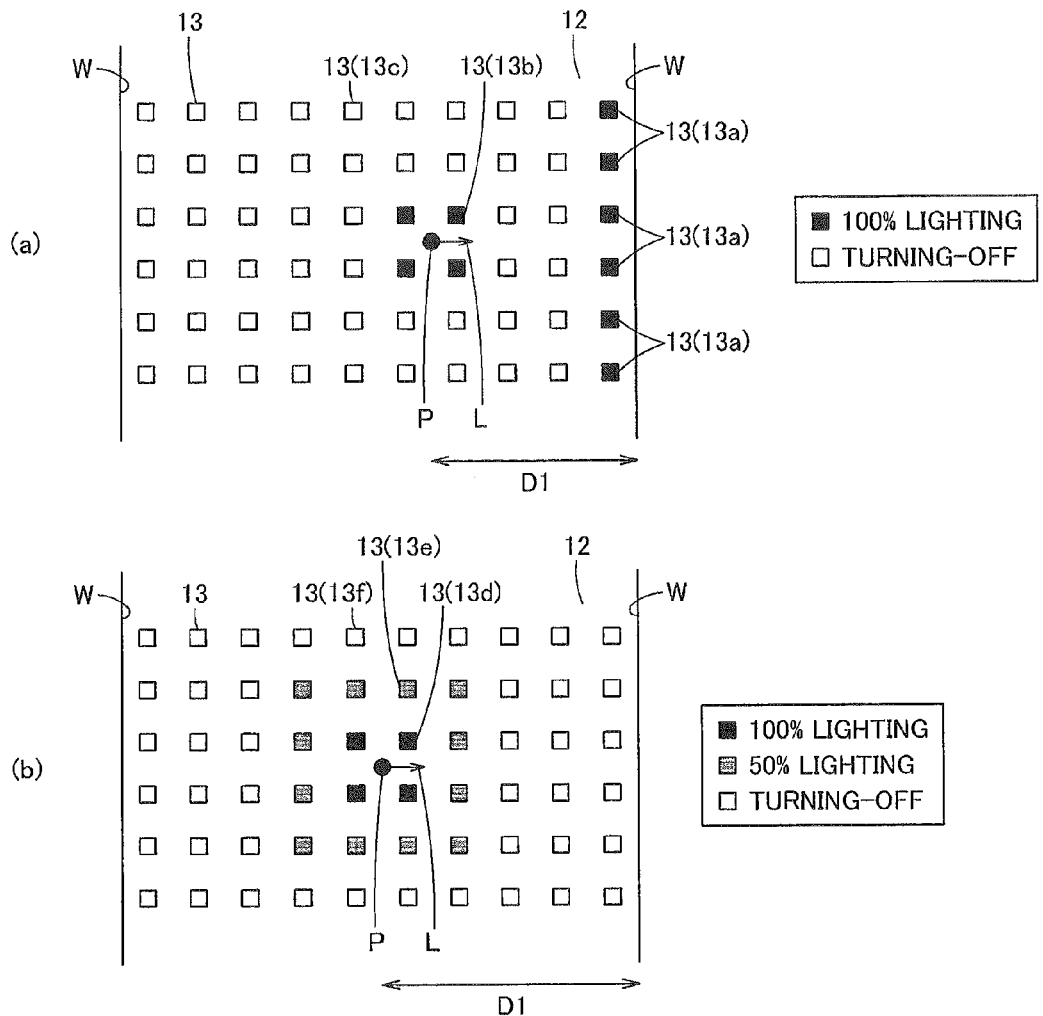
Figure 2:
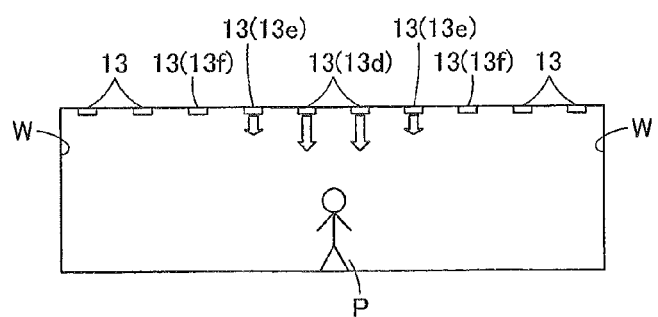
FIG. 2 is a side view schematically showing the second control of the lighting control method.
Figures 3, 4:
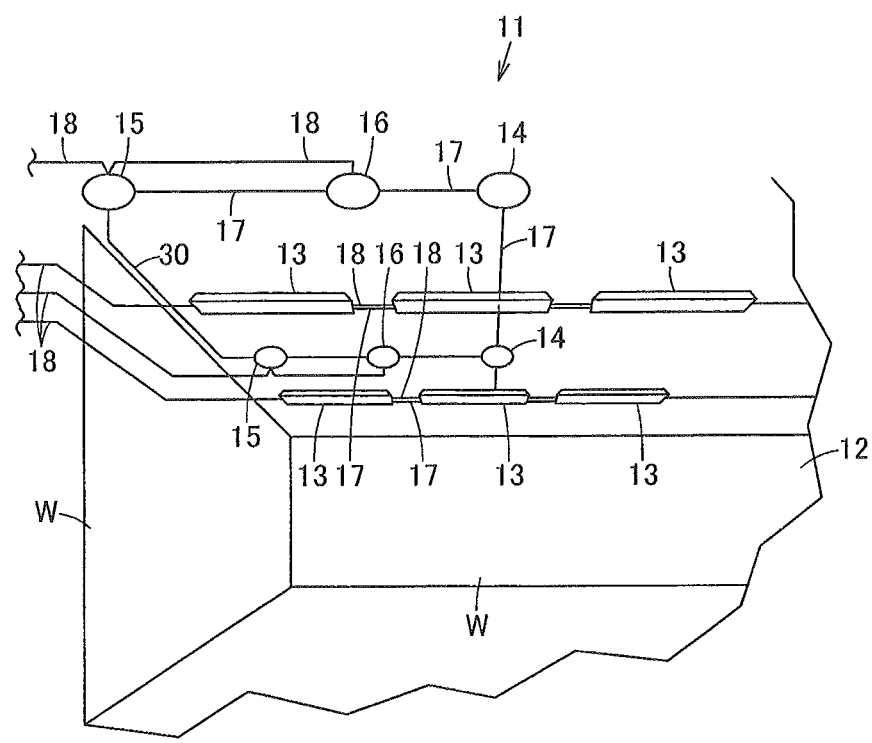
FIG. 3 is an explanatory view schematically showing the lighting control system.
FIG. 4 is a table showing a numerical example of the lighting control system.

As shown in FIG. 1 to FIG. 3, a lighting control system 11 collectively controls lighting states of plural luminaires 13 installed side by side in the whole area of a ceiling or the like of an indoor lighting space 12 of a facility such as an office or a store, and sensor equipments 14 are installed for every plural luminaires 13. Besides, the lighting control system 11 includes lighting control parts 15 as control units configured to perform lighting control of the respective luminaires 13, and communication parts (communication units) 16 to supply control signals from the lighting control parts 15 to the respective luminaires 13. The lighting control parts 15, the plural communication parts 16 and the sensor equipments 14 are connected to be mutually communicable through signal lines 17. Power is supplied to the respective luminaires 13, the sensor equipments 14, the lighting control parts 15 and the communication parts 16 through power supply lines 18 from a not-shown power supply part such as a distribution board.

Incidentally, although the shape of the lighting space 12, the arrangement of the luminaires 13 and the like can be arbitrarily determined, in this embodiment, for clarifying the description, the lighting space 12 has, for example, a square shape, when viewed in plane, surrounded by four wall parts W, and the luminaires 13 are arranged in a matrix form on the ceiling along a specified direction (up-and-down direction in FIGS. 1(a) and 1(b)) of the lighting space 12 when viewed in plane and an intersection direction (right-and-left direction in FIGS. 1(a) and 1(b)) intersecting the specified direction.

The luminaire 13 includes an equipment main body, a dimmable source, such as a fluorescent lamp, a bulb or an LED, disposed in the equipment main body, a lighting device to turn on, to turn off and to dim the light source, a communication unit configured to communicate with the lighting control part 15 through the communication part 16, and a lighting control unit configured to control the lighting device according to the control signal received through the communication unit and to control a lighting state of the light source. The lighting control unit of each of the luminaires 13 has an intrinsic address, and has a function to specify and receive the control signal with its own address transmitted from the lighting control part 15 and to transmit a lighting control state, together with its own address for enabling the lighting control part 15 to specify, to the lighting control part 15.

The sensor equipment 14 is an image sensor (image recognition sensor) having functions of an existence or nonexistence detecting unit configured to detect existence or nonexistence of a person P (presence or absence of existence of the person P) in the lighting space 12, a direction detecting unit configured to detect a direction (arrow L) of the person P, an index detecting unit configured to detect a brightness feeling index value at a position of the person P as a target, and a distance detecting unit configured to detect a distance D1 between the wall part W positioned in front of the direction of the person P and the person P. Incidentally, the installed number of the sensor equipments 14 and positions thereof can be appropriately set according to the width and size of the lighting space 12. Besides, the sensor equipments 14 are divided for the respective functions of the existence or nonexistence detecting unit, the direction detecting unit, the index value detecting unit and the distance detecting unit, and may be individually installed at appropriate positions. When the plural sensor equipments 14 are arranged, intrinsic addresses are set, and the sensor equipments uses the addresses and communicate with the lighting control parts 15 through the signal lines 17.

Here, the sensor equipment 14 divides picked-up image information into mesh-like detection areas (lighting areas), and analyzes the divided image information to two-dimensionally detect where the person P exists in the lighting space 12. That is, the sensor equipment 14 has a function of a position detecting unit configured to detect the position of the person P in the lighting space 12.

Besides, the sensor equipment 14 analyzes the picked-up image information or calculates illuminance based on the image information, and detects an arbitrary brightness feeling index value such as, for example, indirection illuminance (indirect illuminance at eye level) at the position of the eye of the person P, an average luminance of a specified range in the direction of line of sight of the person P, an illuminance on the wall surface, or a luminance dispersion.

Further, the sensor equipment 14 is provided with, for example, a face recognition function for the picked-up image information and can detect the direction of the person P or can detect the direction of the person P from a relative relation between the position of a previously set device, such as a personal computer or a chair, arranged in the lighting space 12 and the person P.

Besides, the sensor equipment 14 can calculate the distance D1 between the wall part W positioned in front of the direction of the person P and the wall part W based on the position of the person P and the direction thereof obtained from the picked-up image information.

Besides, the lighting control parts 15 are mutually connected through a signal line 30, and for example, one of them is a parent machine in the lighting space 12, that is, an area controller, and the remainder is a child machine, that is, a sub-controller. The lighting control parts 15 respectively have intrinsic addresses, and use the addresses to mutually communicate with each other.

Further, the lighting control part 15 is inputted with human detection information including position information of the person from the sensor equipment 14, direction detection information, index value detection information and distance detection information. The lighting control part has a function to switch, if the existence of the person P is detected, between a first control as a wall lighting control for performing lighting control of the luminaires 13 so as to illuminate the wall part W if the distance D1 between the wall part W positioned in front of the direction of the person P and the person P is a specified distance DTH1 or less, and a second control as a gradation lighting control for performing lighting control of the luminaires 13 (for performing dimming lighting of the luminaires 13) so as to reduce the brightness at a place (to deepen the dimming degree or to reduce the dimming ratio) as the place becomes farther from the position of the person P if the distance D1 between the wall part W and the person P is larger than the specified distance DTH1. The lighting control of the luminaires 13 by the lighting control part 15 is performed so that before and after the switching between the first control and the second control, the change rate of the brightness feeling index value of the lighting space 12 detected by the sensor equipment 14 is within a specified range. That is, the specified distance DTH1 as the threshold of the switching between the first control and the second control is set so that before and after the switching between the first control and the second control, the change rate of the brightness feeling index value of the lighting space 12 detected by the sensor equipment 14 is within the specified range. Here, the specified distance DTH1 may be previously set and stored in the lighting control part 15, or may be calculated by the lighting control part 15 based on a required brightness feeling index value.

If the distance D1 between the person P and the wall part W is the specified distance DTH1 or less, the lighting control part 15 turns on the luminaires 13 (luminaires 13a) positioned along the wall part W in a specified first lighting state, for example, a full-light state (100% lighting state) (FIG. 1(a)). At this time, with respect the luminaires 13 positioned along the wall part W, at least luminaires capable of illuminating the wall part W within a range where the person P can visually recognize the wall are turned on, and every other luminaire (every specified number of luminaires) may be turned on in the direction along the wall part W. Further, for example, the luminaires 13 (luminaires 13b) positioned above the person P (in the lighting area including the position of the person P) may be turned on in a specified lighting state, for example, the full-light state (100% lighting state). Incidentally, other luminaires 13 (luminaires 13c) are turned off. Besides, in the first control by the lighting control part 15, the luminaires 13 (luminaires 13a) along the wall part W and the luminaires 13 (luminaires 13b) positioned above the person P are not necessarily required to be turned on in the full-light state (100% lighting state), and the dimming degree (dimming ratio) can be arbitrarily set according to the required brightness feeling (brightness feeling index value).

Further, if the distance D1 between the person P and the wall part W is larger than the specified distance DTH1, the lighting control part 15 turns on the luminaires 13 (luminaires 13d) positioned above the person P (in the lighting area including the position of the person P) in a specified first lighting state, for example, the full-light state (100% lighting state), turns on the luminaires 13 (luminaires 13e) positioned around them in a second lighting state (dimming lighting state) darker than the full-light state, for example, a 50% lighting state, and turns off the other remaining luminaires 13 (luminaires 13f) (FIG. 1(b)). Incidentally, in the second control of the lighting control part 15, with respect to the luminaires 13 (luminaires 13d) positioned above the person P, as long as the luminaires 13 (luminaires 13e) positioned around them are turned on so that the brightness is relatively reduced, the dimming degree (dimming ratio) can be arbitrarily set according to the required brightness feeling (brightness feeling index value).

As described above, according to the first embodiment, the lighting control of the luminaires 13 is switched between the first control and the second control according to the distance D1 between the person P and the wall part W positioned in front of the direction of the person P, so that energy saving is achieved, and the brightness feeling of the lighting space 12 can be effectively ensured according to the position of the person P in the lighting space 12.

Specifically, for example, in the lighting space 12 where the luminaires 13 were almost uniformly arranged at intervals of 1.8 m, the distance D1 between the person P and the wall part W was changed by a unit of 1.8 m, the first control in which six luminaires 13 (luminaires 13a) along the wall part W positioned in front of the direction of the person P and four luminaires 13 (luminaires 13b) above the person P were turned on at 100%, and the second control in which four luminaires 13 (luminaires 13d) above the person P were turned on at 100% and twelve luminaires 13 (luminaires 13e) around them were turned on at 50% were performed, and the brightness feeling index of the lighting space 12, for example, the indirect illuminance at eye level was obtained. Each of the first control and the second control has the same power consumption as that of the case where ten luminaires 13 are turned on at 100%, and the power consumptions of the first and the second controls are equal to each other. When the distance D1 between the person P and the wall part W is 9.0 m, the brightness feeling indexes of the first control and the second control become equal to each other (FIG. 4). Accordingly, 9.0 m is set as the specified distance DTH1, that is, if the distance D1 between the person P and the wall part W is 9.0 m or less, the lighting control part 15 selects the first control, and if the distance D1 between the person P and the wall W is larger than 9.0 m, the lighting control part 15 selects the second control. As a result, the power consumptions of the first control and the second control are equal to each other, the brightness feeling of the lighting space 12 can be effectively obtained, and even if the first control and the second control are selectively switched, the brightness feeling is not changed.

Incidentally, in the first embodiment, although the person P is positioned between the luminaires 13 and 13 when viewed in plane, for example, when the person is positioned on the column (row) of the luminaires 13, for example, the person is positioned just below the luminaire 13, the luminaires 13 (the luminaires 13b or the luminaires 13d) above the person P in the first control and the second control of the lighting control part 15 may be the luminaire 13 just above the person P or the luminaires 13 positioned in a specified range around the luminaire 13 just above the person P.

Besides, in the first control and the second control, the setting can also be performed so that the lighting control of the luminaires 13 is performed in an arbitrary unit, for example, in a unit of one luminaire, in a unit of the luminaires 13 positioned in a detection area of the sensor equipment 14, or in a unit of a lighting area set by the luminaire 13.

Figure 5:
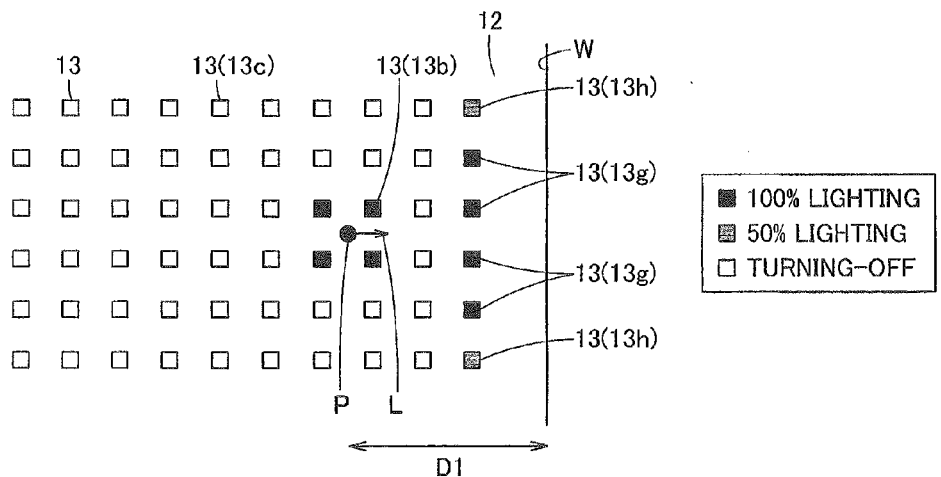
FIG. 5 is a plan view schematically showing a first control of a lighting control method of a lighting control system of a second embodiment.

Further, for example, as in a second embodiment shown in FIG. 5, in the first control, the luminaires 13 may be turned on in gradation such that brightness at a place when the luminaires 13 placed along the wall part W are turned on is reduced as the place becomes farther from the position in front of the person P toward both right and left sides, that is, the luminaires 13 (luminaires 13g) disposed at the position of the wall part W opposite to the person P are turned on in the full-light state (100% lighting state) as a first lighting state and the luminaires 13 (luminaires 13h) positioned at both sides of the luminaires 13 (luminaires 13g) in the full-light state are turned on in the 50% lighting state as a second lighting state in which the brightness is lower than the first lighting state.

Figure 6:
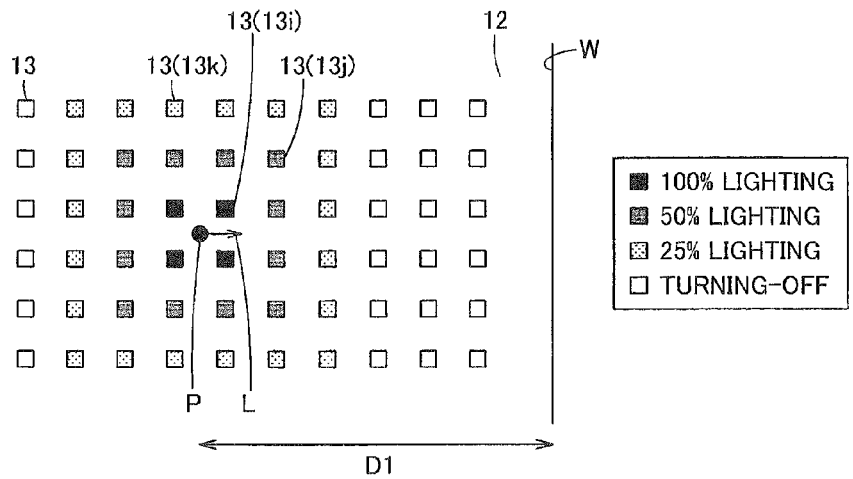
FIG. 6 is a plan view schematically showing a second control of a lighting control method of a lighting control system of a third embodiment.

Besides, in the second control of the above respective embodiments, the gradation lighting may be more finely performed such that plural lighting states different in brightness, for example, three or more lighting states occur in a region from the luminaires 13 above the person P to the luminaires 13 around them. For example, as in a third embodiment shown in FIG. 6, in the second control, the gradation lighting may be more finely performed such that the luminaires 13 (luminaires 13i) positioned above the person P are turned on in the full-light state (100% lighting state) as a first lighting state, the luminaires 13 (luminaires 13j) positioned around the luminaires 13 (luminaires 13i) in the full-light state are turned on in the 50% lighting state as a second lighting state in which the brightness is lower than the first lighting state, and the luminaires 13 (luminaires 13k) positioned around the luminaires 13 (luminaires 13j) are turned on in a 25% lighting state as a third lighting state in which the brightness is lower than the second lighting state.

Figure 7:
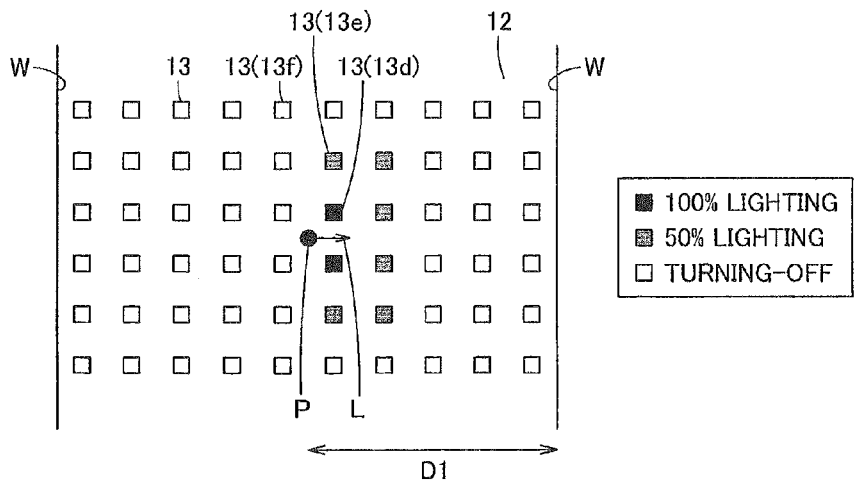
FIG. 7 is a plan view schematically showing a second control of a lighting control method of a lighting control system of a fourth embodiment.

Besides, in the above respective embodiments, as in a fourth embodiment shown in FIG. 7, in the second control, only luminaires 13 in front of the direction of the person P are turned on, and the luminaires 13 in the opposite direction are turned off, so that the brightness feeling is ensured without reducing the amount of light entering the field of vision of the person P, and further energy saving may be achieved.

Figure 8:
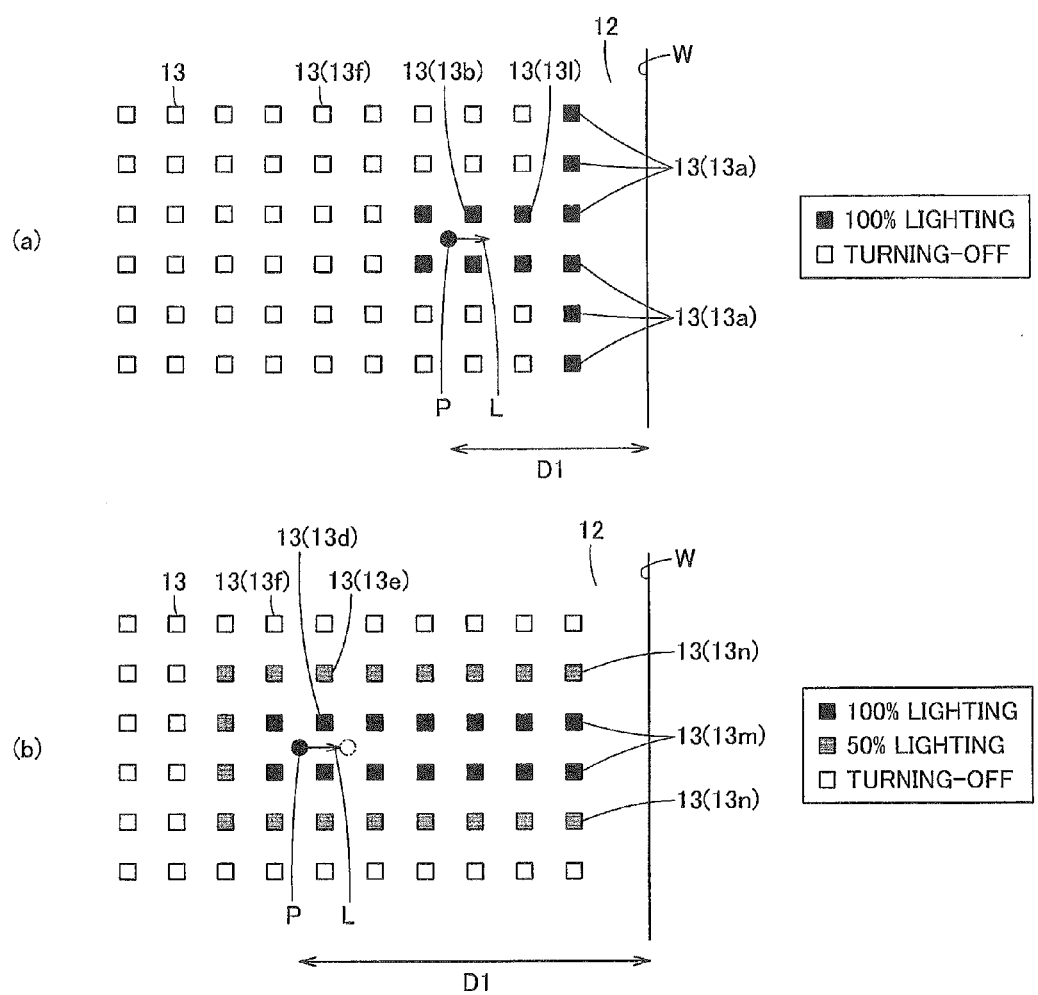
Figure 9:
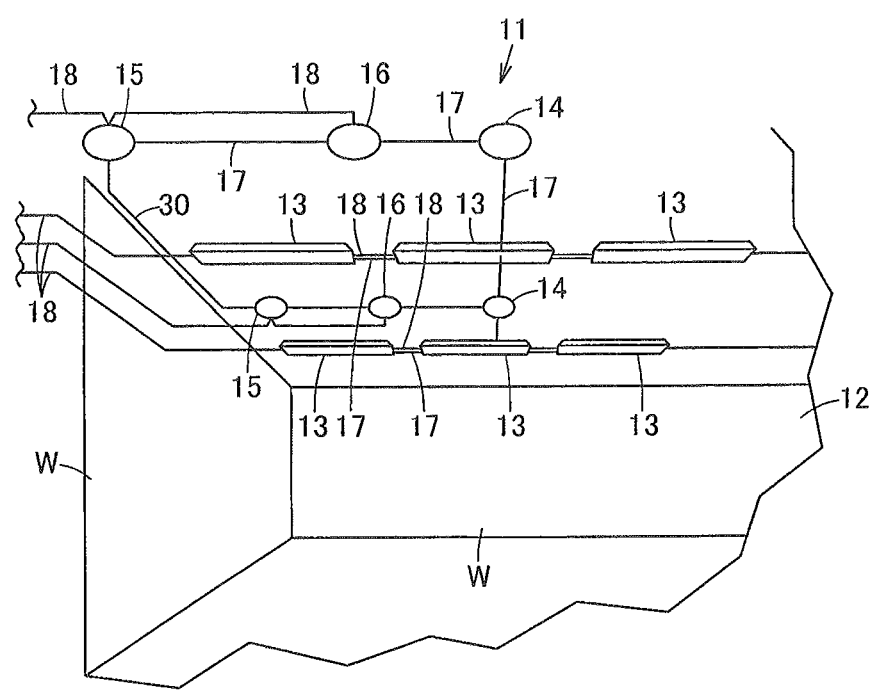
FIG. 9 is an explanatory view schematically showing the lighting control system.

Next, a fifth embodiment will be described with reference to FIG. 8 and FIG. 9. Incidentally, the same components as those of the first embodiment are denoted by the same reference numerals and their description will be omitted.

According to the fifth embodiment, in the first embodiment, the sensor equipment 14 has a function of a movement detecting unit configured to detect movement of the person P.

The sensor equipment 14 can detect the movement direction of the person P by, for example, analyzing picked-up image information or by time difference in the detection of existence of the person P by plural adjacent sensor equipments 14.

Besides, when the sensor equipment 14 detects the movement of the person P, the lighting control part 15 turns on at least the luminaires 13 positioned in the advancing direction of the movement (in the lighting area positioned in the advancing direction of the movement of the person P), and when the sensor equipment 14 does not detect the movement of the person P, the lighting control part turns on only the luminaires 13 at the position where the person P exists (in the lighting area including the position of the person P).

Specifically, if the distance D1 between the person P and the wall part W is the specified distance DTH1 or less, the lighting control part 15 performs a first control in which the luminaires 13 (luminaires 13a) positioned along the wall part W are turned on in a specified first lighting state, for example, in the full-light state (100% lighting state), and the luminaires 13 (luminaires 13l) in the advancing direction of the movement of the person P are turned on in, for example, the full-light state (100% lighting state) (FIG. 8(a)). Incidentally, the luminaires 13 (luminaires 13l) in the advancing direction of the movement of the person P may be placed in an arbitrary dimming lighting state other than the 100% lighting state. Besides, although all the luminaires 13 positioned between the person P and the wall part W are turned on as the luminaires 13 in the advancing direction of the movement of the person P, lighting control of the luminaires 13 positioned between the person P and a place spaced from the person by an arbitrary distance may be performed.

Besides, if the distance D1 between the person P and the wall part W is larger than the specified distance DTH1, the lighting control part 15 performs a second control in which the luminaires 13 (luminaires 13d) positioned above the person P (in the lighting area including the position of the person P) are turned on in a specified first lighting state, for example, the full-light state (100% lighting state), the luminaires 13 (luminaires 13e) positioned around them are turned on in a second lighting state (dimming lighting state) in which the brightness is lower than the full-light state, for example, in the 50% lighting state, the luminaires 13 (luminaires 13m) in the advancing direction of the movement of the person P and positioned between the person P and the wall part W are turned on in, for example, the full-light state (100% lighting state) as the first lighting state, the luminaires 13 (luminaires 13n) positioned at both sides of the luminaires 13 (luminaires 13m) are turned on in the 50% lighting state as the second lighting state, and the remaining luminaires 13 (luminaires 13f) are turned off (FIG. 8(b)).

Incidentally, the luminaires 13 (the luminaires 13m or the luminaires 13n) in the advancing direction of the movement of the person P may be placed in an arbitrary dimming lighting state. Besides, although all the luminaires 13 positioned between the person P and the wall part W are turned on as the luminaires 13 in the advancing direction of the movement of the person P, lighting control of the luminaires 13 positioned between the person P and a place in front of the person and spaced therefrom by an arbitrary distance may be performed.

As stated above, when the sensor equipment 14 detects the movement of the person P, at least the luminaires 13 (the luminaires 13l, the luminaires 13m or the luminaires 13n) on the advancing direction side of the movement are turned on, so that the brightness feeling of the lighting space 12 can be improved when the person P moves toward the position in the lighting space 12 where the person does not exist. Accordingly, the person P is not obliged to move in the dark lighting space 12, and a pleasant working environment can be obtained. Further, if the person P does not move, the unnecessary luminaires 13 are turned off by the first lighting control and the second lighting control, and energy saving can be achieved.

Further, if the movement of the person P is detected by analyzing the image picked up by the sensor equipment 14 as the image sensor, the number of the sensor equipments 14 is not required to be increased more than necessary, and the structure of the lighting control system 11 can be more simplified.

Besides, if the movement of the person P is detected based on the time difference in the detection of the person P by the plural adjacent sensor equipments 14, a complicated calculation process or the like is not required, and a processing program can be more simplified.

Incidentally, in the fifth embodiment, when the sensor equipment 14 detects the movement of the person P, as long as the lighting control part 15 turns on at least the luminaires 13 in the advancing direction of the movement of the person P, the lighting state of the other luminaires 13 can be arbitrarily set. For example, the lighting control part 15 may perform a third control in which all the luminaires 13 in the lighting space 12 are turned on irrespective of the distance between the person P and the wall part W positioned in front of the person P.

Figure 10:
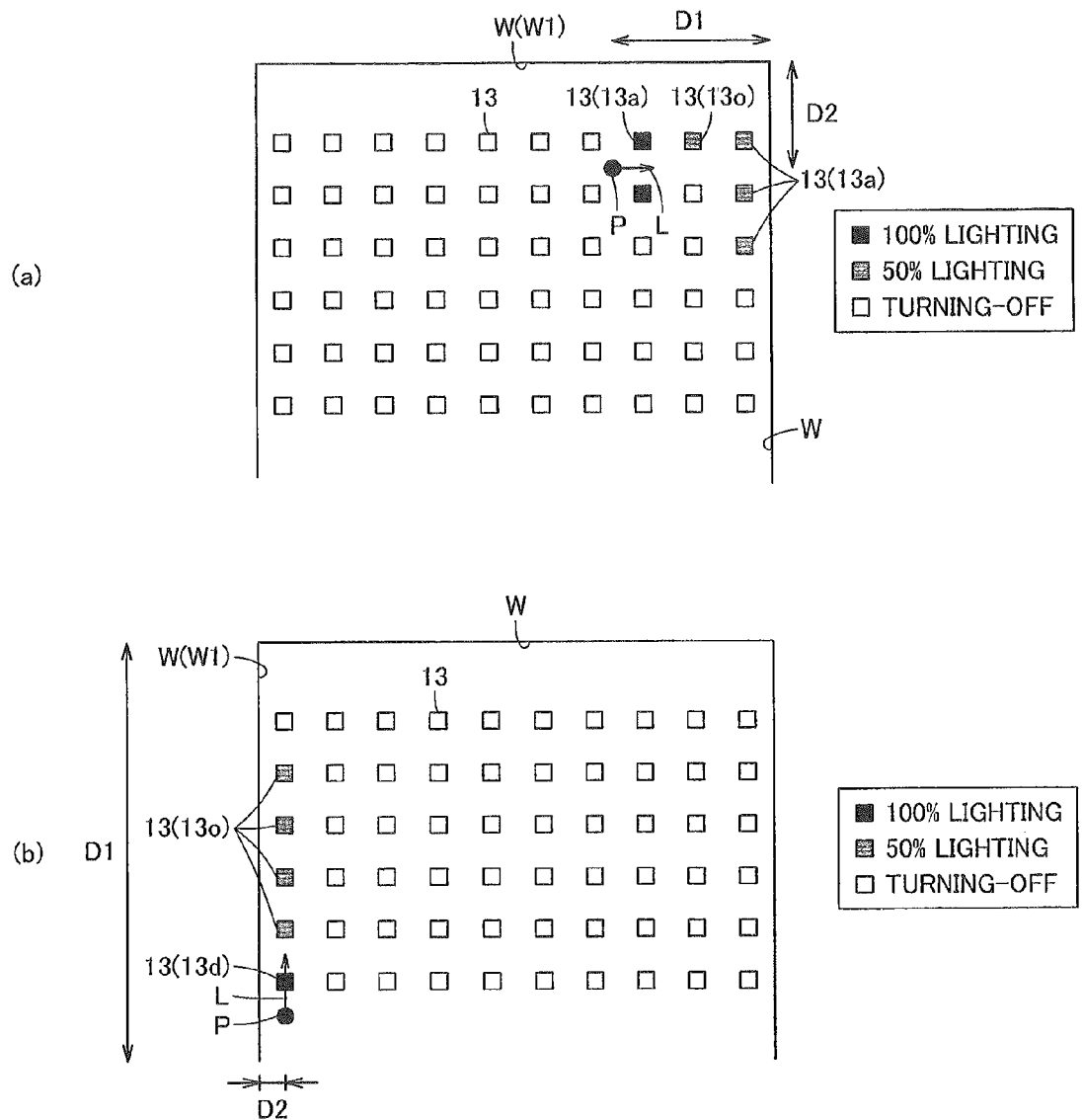

Besides, in the above respective embodiments, if a distance D2 between the person P and the wall part W (wall part W1) positioned on the side of the person P is smaller than a specified distance DTH2, for example, as in a sixth embodiment shown in FIGS. 10(a) and 10(b), the luminaires 13 (luminaires 13o) along the wall part W1 are turned on and the brightness feeling may be further improved. At this time, the lighting state of the luminaires 13 (luminaires 13o) along the wall part W1 can be arbitrarily set.

Further, for example, the luminaires 13 may include upper light sources capable of irradiating light in an upper direction than a horizontal direction and lower light sources capable of irradiating light in a lower direction than the horizontal direction. These light sources can be independently subjected to lighting control, and the brightness may be reduced by bringing a state in which the lower light sources are turned off and only the upper light sources are turned on, instead of reducing the brightness by performing dimming control of the luminaires 13.

Besides, as the direction detecting unit configured to detect the direction of the person P, not only an active detecting structure using the sensor equipment 14, but also a passive detecting structure may be adopted in which the direction of the person P is passively detected by, for example, manually inputting the direction of the person P by using a remote controller or the like. In this case, the direction of the person P can be more certainly detected by a simpler control.

Further, the sensor equipments 14 are installed also on the wall surfaces W, and the position of the person P may be three-dimensionally grasped.

According to at least one of the embodiments described above, the lighting control of the luminaire 13 is switched between the first control and the second control according to the distance D1 between the person P and the wall part W positioned in front of the direction of the person P, so that the energy saving is achieved, and the brightness feeling of the lighting space 12 can be effectively ensured according to the position of the person P in the lighting space 12.

That is, if the person P is sufficiently close to the wall part W, the first control is selected, and the luminaires 13 (the luminaires 13a, the luminaires 13g or the luminaires 13h) in the vicinity of the wall part W positioned in front of the direction of the person P are turned on so that the wall part W is illuminated, and the brightness feeling of the lighting space 12 can be ensured in cooperation with the lighting of the luminaires 13 (luminaires 13b) above the person P. In the first control, the brightness feeling higher than the brightness feeling obtained in the second control can be obtained.

Besides, if the person P is far from the wall part W, even if the luminaires 13 (the luminaires 13a, the luminaires 13g or the luminaires 13h) in the vicinity of the wall part W are turned on, there is a case where the person does not feel brightness in the visual field when the person P looks down at, for example, a desk or the like. Thus, the second control is selected, and the gradation lighting control of the luminaires 13 is performed so that the brightness at a place is gradually reduced as the place becomes farther from the person P, and the brightness feeling can be ensured without turning on the luminaires 13 more than necessary.

Further, since the luminaires 13 positioned in front of the person P are turned on, even if the person P looks down at, for example, the desk or the like, the person can feel brightness in the visual field.

Since the brightness feeling can be obtained without illuminating the whole wall part W surrounding the lighting space 12 by the luminaires 13, the energy saving can be achieved.

Further, since the lighting method is switched according to the distance D1 between the person P and the wall part W positioned in front of the person, even if the person P exists at any position in the lighting space 12, the brightness feeling is hardly impaired.

Besides, when the first control and the second control are switched, the change rate of the brightness feeling index value at the position of the person P in the lighting space is made to fall within the specified range, so that uncomfortable feeling due to the change of the brightness feeling at the switching between the first control and the second control can be reduced.

Since the first control and the second control are selectively switched to perform lighting control of the luminaires 13, as compared with the case where the luminaires positioned in an area where the person P does not exist are turned off, the amount of light entering the field of vision of the person P is large. Thus, both the energy saving and the ensuring of the brightness feeling can be expected.

Further, the sensor equipment 14, as the image sensor, is made to have the functions of the existence or nonexistence detecting unit, the direction detecting unit and the distance detecting unit, so that the one sensor equipment 14 can perform these plural functions, and the structure can be more simplified.

While certain embodiments have been described, these embodiments have been presented by way of example only, and are not intended to limit the scope of the inventions. Indeed, the novel systems and methods described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A lighting control system comprising:
   a plurality of luminaires installed in a lighting space surrounded by walls;
   an existence or nonexistence detecting unit configured to detect existence or nonexistence of a person in the lighting space;
   a direction detecting unit configured to detect a direction the person is facing if the existence or nonexistence detecting unit detects the existence of the person in the lighting space;
   a distance detecting unit configured to detect a distance between one of the walls positioned in front of the person in the facing direction detected by the direction detecting unit, and the person; and
   a control unit configured to selectively switch between a first control for performing lighting control of the luminaires to illuminate said one of the walls positioned in front of the person in the facing direction if the distance detected by the distance detecting unit is a specified distance or less, and a second control for performing lighting control of the luminaires to reduce brightness at positions in the lighting space that are farther from a position of the person if the distance detected by the distance detecting unit is larger than the specified distance.

2. The system according to claim 1, further comprising an index value detecting unit configured to detect a brightness feeling index value at a position in the lighting space, wherein
   the control unit is configured to switch between the first control and the second control such that a change rate of the brightness feeling index value at the position of the person in the lighting space as detected by the index value detecting unit falls within a specified range.

3. The system according to claim 1, further comprising a movement detecting unit configured to detect movement of the person, wherein
   if the movement detecting unit detects the movement of the person, the control unit turns on at least the luminaires that are positioned along an advancing direction of the movement.

4. The system according to claim 3, wherein the movement detecting unit detects the movement of the person based on a difference between times of detection of the existence of the person by a plurality of existence or nonexistence detecting units.

5. The system according to claim 3, wherein the movement detecting unit is an image sensor.

6. The system according to claim 1, wherein the direction detecting unit and the distance detecting unit are each an image sensor.

7. A method of controlling lighting of a plurality of luminaires installed in a lighting space, comprising:
   selectively switching between a first control for performing lighting control of the luminaires to illuminate a wall positioned in front of a person in the lighting space if a distance between the person and the wall is a specified distance or less, and a second control for performing lighting control of the luminaires to reduce brightness at positions in the lighting space that are farther from a position of the person if the distance between the person and the wall is larger than the specified distance.

8. The method according to claim 7, wherein the first control and the second control are switched in such a manner that a change rate of a brightness feeling index value at the position of the person in the lighting space falls within a specified range.

9. The method according to claim 7, wherein if movement of the person is detected, at least the luminaires that are positioned along an advancing direction of the movement are turned on.

10. The method according to claim 9, wherein a plurality of existence or nonexistence detecting units are installed in the lighting space to detect the position of the person, and
    the movement of the person is detected based on a difference between times of detection of the existence of the person by the existence or nonexistence detecting units.

11. The method according to claim 9, wherein the movement of the person is detected by an image sensor.

12. The method according to claim 7, wherein the distance between the person and the wall and a direction that the person is facing are each detected by an image sensor.

13. A method of controlling lighting of a plurality of luminaires installed in a lighting space, comprising:
    detecting a position of a person in the lighting space and a direction that the person is facing; and
    performing lighting control of the luminaires to illuminate a wall that is located in front of the person if a distance between the person and the wall is a specified distance or less, and performing lighting control of the luminaires to reduce brightness at positions in the lighting space that are farther from the position of the person if the distance between the person and the wall is larger than the specified distance.

14. The method of claim 13, wherein the luminaires include first and second luminaires, the first luminaire being located in the lighting space to be closer to the person than the second luminaire, and the first luminaire is controlled to be brighter than the second luminaire.

15. The method of claim 14, wherein the luminaires further include a third luminaire that is located in the lighting space to be farther from the person than the second luminaire, and the second luminaire is controlled to be brighter than the third luminaire.

16. The method of claim 15, wherein the luminaires further include a fourth luminaire that is located in the lighting space to be farther from the person than the third luminaire, and the first and fourth luminaires are respectively controlled to be turned on 100% and turned off.

17. The method of claim 15, wherein the luminaires further include a fourth luminaire that is located in the lighting space to be equidistant to the person as the first luminaire, and the first and fourth luminaires are respectively controlled to be turned on 100% and turned off.

18. The method according to claim 13, wherein the distance between the person and the wall and the direction that the person is facing are each detected by an image sensor.

* * * * *